Jan. 7, 1941.　　　O. W. PINEO　　　2,227,510
MONOCHROMATOR
Filed Sept. 2, 1938　　　4 Sheets-Sheet 3
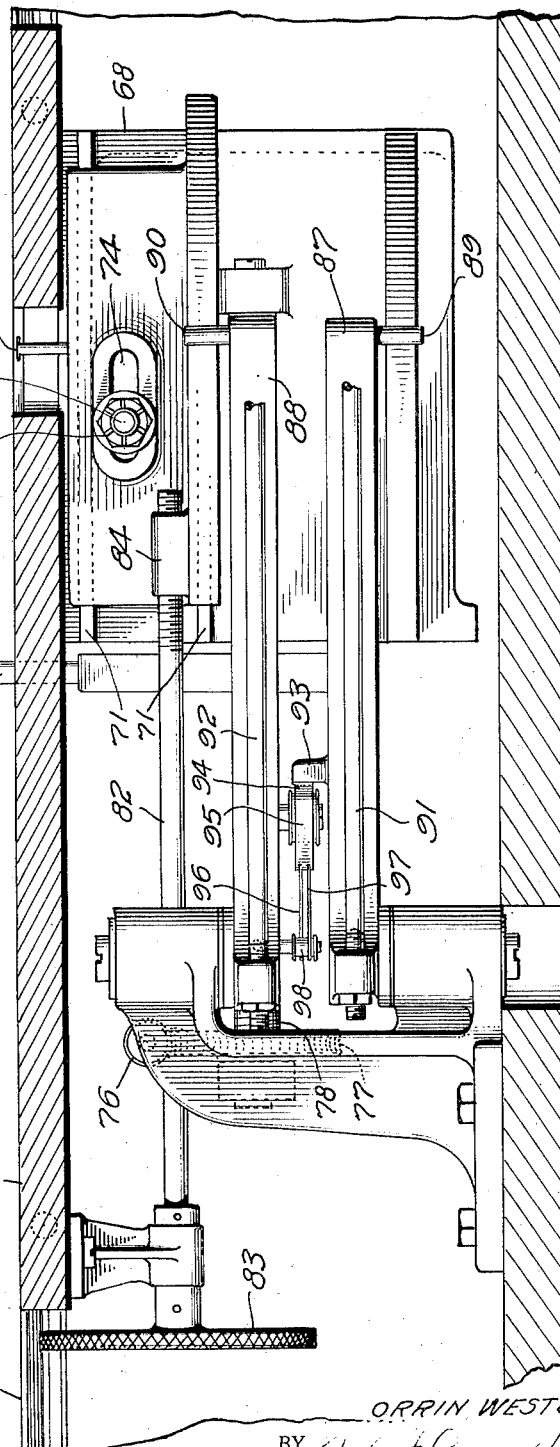
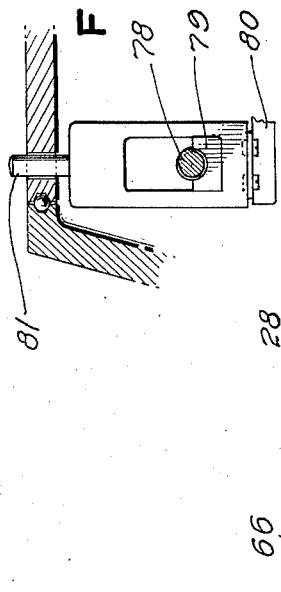
INVENTOR.
ORRIN WESTON PINEO,
BY
ATTORNEY.

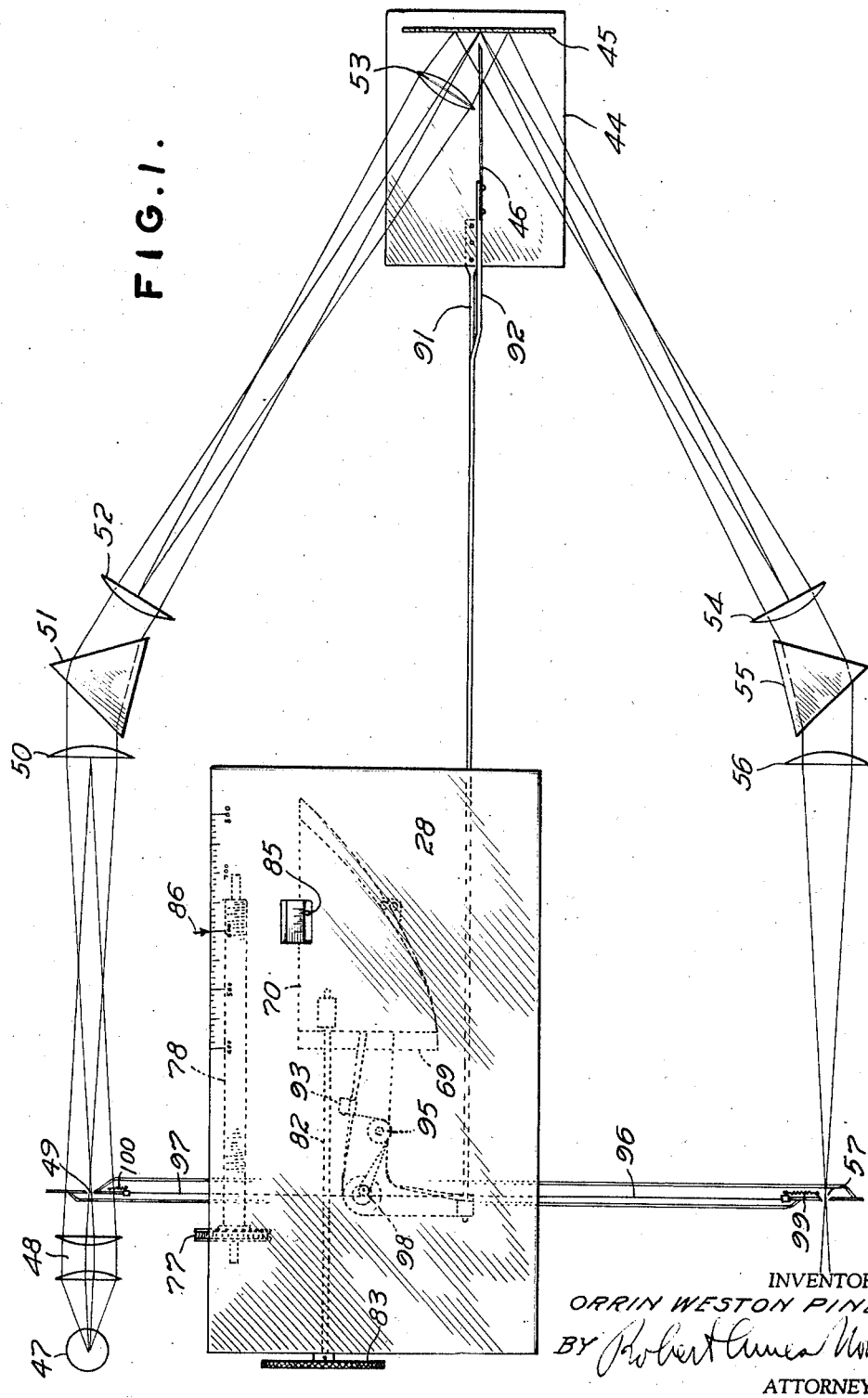

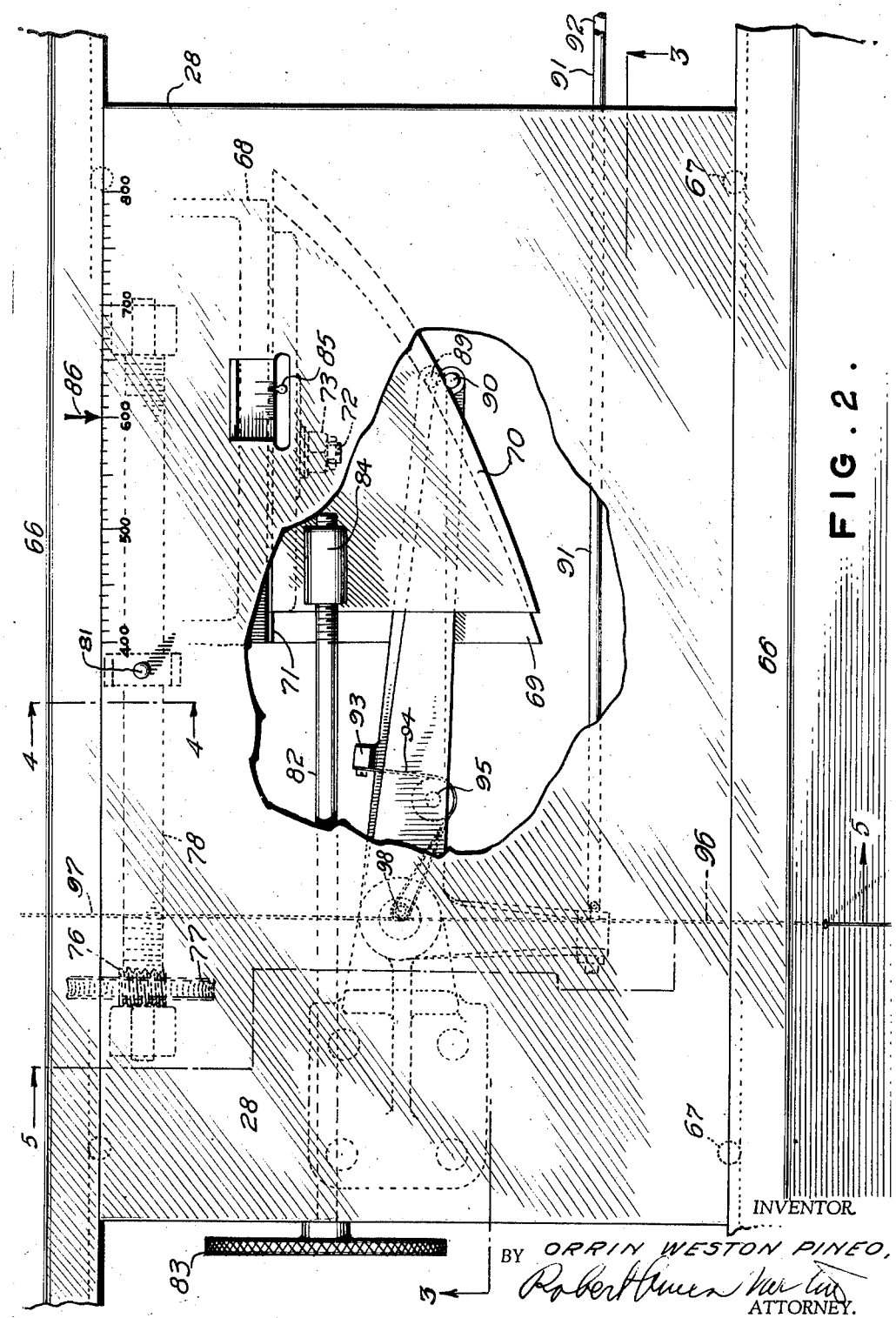

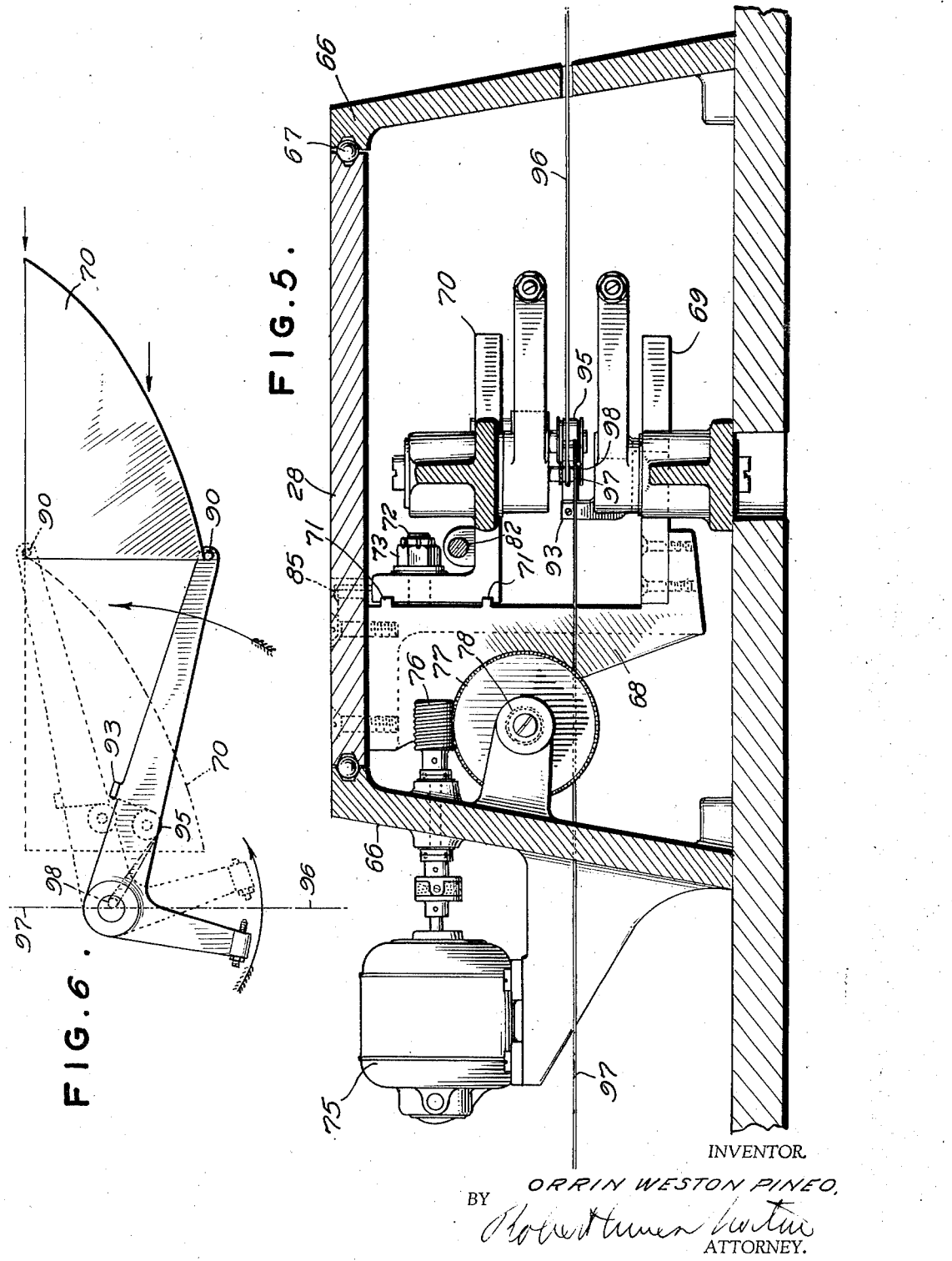

Patented Jan. 7, 1941

2,227,510

UNITED STATES PATENT OFFICE 2,227,510

MONOCHROMATOR

Orrin W. Pineo, Milo, Maine, assignor, by mesne assignments, to American Cyanamid Company, New York, N. Y., a corporation of Maine Application September 2, 1938, Serial No. 228,127

2 Claims. (Cl. 88—14)

This invention relates to monochromators and more particularly, to monochromators for use in spectrophotometers. This application is a continuation in part of application, Serial No. 54,829, filed December 17, 1935, which in turn was a division of my application, Serial No. 11,600, filed March 18, 1935.

In the past, difficulties have been encountered with monochromators to be used through a wide band of the spectrum, particularly in conjunction with spectrophotometers, due to the fact that the band of light defined by the slits in the monochromator, and particularly by the exit slit, varies in wave length or frequency range in different parts of the spectrum if the slit width is maintained constant. As a result, a broader band of wave length or frequency is transmitted at one part of the spectrum than at another which is undesirable for spectrophotometric use. It has been proposed to provide a drive, for example by cams, which varies the slit width at different parts of the spectrum to maintain a constant range of wave length or frequency in the band of light transmitted by the slit. Such a device represents an improvement and permits maintaining a constant range of wave length or frequency in the transmitted band. However, this range cannot be changed except by dismantling a portion of the device and inserting cams of different shape.

Monochromators according to the present invention are provided with means for maintaining bands of constant wave length or frequency throughout the spectrum and for varying the width of the band by adjustable mechanism so that bands of any desired range of frequency or wave length can be chosen and the range thus chosen maintained throughout the spectrum.

Essentially, the present invention is directed to a drive linkage between a portion of the monochromator which shifts the band of light transmitted through the spectrum and movable slit defining members, the linkage consisting of variable ratio drive members, such as cams, which maintain a given range of band throughout the spectrum and linear drive mechanisms, the variable ratio drive members being so constructed that the movement of the linear drive connected to the slit members is in proportion to the relative physical widths in different portions of a prismatic spectrum of units of wavelength or frequency. The drive linkage consists of separate drives to the two slit defining members with displacement means provided between the two.

The monochromator may have one or more slits controlled by the present invention. In some cases, it is sufficient to control only the exit slit. However, where a double monochromator is used with a recording photoelectric spectrophotometer, more accurate results are obtained by providing all three slits with drives according to the present invention. The invention will be described in detail in conjunction with the drawings which show a monochromator slit drive in conjunction with a double monochromator suitable for use with a photoelectric spectrophotometer.

Fig. 1 is a plan view of a monochromator showing separate drives to the slit defining members;

Fig. 2 is a plan view, partly broken away, on an enlarged scale, of a portion of Fig. 1;

Fig. 3 is a vertical section along the line 3—3 of Fig. 2;

Fig. 4 is a vertical section along the line 4—4 of Fig. 2;

Fig. 5 is a vertical section along the line 5—5 of Fig. 2; and

Fig. 6 is a detail of the drive of one of the cams, showing two positions.

The device shown in Figs. 1-6 is a simple drive in which there is a separate cam drive for each set of jaws.

The monochromator is provided with a light source 47 from which light passes through condensing lenses 48 and entrance slit 49 and a second lens 50 to the prism 51. The spectrum formed by this prism passes through lenses 52 and 53, strikes the mirror 45 in which it is reflected, passes through the lens 54, the second prism 55 and lens 56 to the exit slit 57. Movement of the carriage 44 moves the slit, defined by the knife edge 46 and its image in the mirror 45, through the spectrum produced by the first prism and therefore determines the location in the spectrum of the band which passes out through the exit slit 57 after a further removal of unwanted wavelengths by the second prism 55.

The table 28 which is moved in its framework 66 on the balls 67 carries attached thereto a frame 68 on which are mounted two cams 69 and 70. The former is rigidly attached to the frame moving with the table, whereas the latter is capable of sliding on the tracks 71, being held thereon by a bolt 72 passing through a slot 74 and held by a nut 73 sufficiently firmly so that it can move but does not have any sideways play.

The table itself is driven as is conventional in monochromators by a motor 75 through a worm 76, worm gear 77 and threaded shaft 78 which passes through a half nut 79 (Fig. 4) which is spring mounted in a frame 80 connected to the table. The nut can be disengaged by pressing down the push button 81 (Figs. 2 and 4) when it is desired manually to return the table to its original position.

The two cams 69 and 70 move with the table and in addition the cam 70 can be adjusted with respect to the table by means of the threaded shaft 82 and knurled knob 83 which shaft screws into a threaded portion 84 on the framework of the cam 70 (Figs. 2 and 3). The thread on shaft 82 is of very fine pitch and permits close adjustment of the cam 70. The adjustment can be read by means of an index pointer 85 carried by the framework of the cam 70 and extending up through a slot in the table 28 (Figs. 1, 5). The portion of the table adjacent the slot is provided with a suitable scale (Figs. 1 and 2) so that the amount of displacement of the cam 70 with respect to the table can be read off on the scale by means of the pointer 85. Preferably the scale graduations are in terms of band width; for example, if the band is to be measured by wave length, in millimicrons.

The table 28 further carries a scale at its edge (Figs. 1 and 2) which moves along an index mark 86 on the stationary framework of the monochromator. This clearly shows the position of the whole table and is calibrated throughout the spectrum to give the location of the band of light leaving the exit slit in terms of its color location in the spectrum. In the monochromator illustrated in Figs. 1 and 2 where band width is measured in terms of wave length, the scale is in millimicrons. Any other suitable scale may, of course, be used where monochromators calculated in frequencies or other units are desired.

Two bell cranks 87 and 88 are journaled in a framework attached to the monochromator frame and not moving with the table (Fig. 3). These bell cranks are provided on their longer arms, respectively, with cam followers 89 and 90 which engage the profiles of cams 69 and 70 respectively. The short arm of bell crank 87 is connected through the rod 91 to the carriage 44 which bears the mirror 45 of the monochromator. The short arm of the bell crank 88 connects through a rod 92 to the jaw 46 which with the mirror 45 defines the middle slit of the monochromator. Bell crank 87 on its longer arm is provided with a lug 93 to which a suitable cable or preferably, as is shown in the drawings, a steel ribbon 94 is attached. This ribbon runs over a pulley 95 journaled on the long arm of the bell crank 88 but situated closer to the axis of rotation than is the lug 93. After passing over the pulley 95, two steel cables 96 and 97 are attached to the end of the ribbon 94 and pass in opposite directions around the pulley 98 which is journaled in the bell crank 88. Pulley 98 is positioned so that cables 96 and 97 leave it at the center of rotation of bell crank 88. Cable 96 runs to one jaw of the exit slit 57 pulling the latter against the tension of a small spring 99. Similarly, cable 97 extends to one jaw of the entrance slit of the monochromator, pulling against a small spring 100. The corresponding jaws of the entrance and exit slits are coupled together by rods so that a bilateral jaw motion is obtained. The motion of these jaws is made less than that at the selector slit, in proportion to the obliquity of light passage through the latter, by choice of the radial distances of lug 93 and pulley 95.

The profiles of the cams 69 and 70 are identical and are so shaped that they will keep the band width passing through the slit constant throughout the spectrum with respect to a certain predetermined function; the scale on the table is linear in the same function. Thus, for example, if the cams 69 and 70 give a scale uniform in frequency, a predetermined separation of the cams along the scale will produce a separation of the slit jaws proper to pass a band of the spectrum corresponding to the interval of separation on the scale and therefore of predetermined and constant interval of frequency.

The drive from the motor to the slit defining members may be considered as consisting of three drives in series. The drive from the motor to the table and hence to the cams is linear and its ratio is determined by the gearing 76—77 and 78—79. The drive from each cam to the corresponding bell crank is of varying ratio, the ratio variation being determined by the profile of the cam. The drive from cam followers through bell cranks and rods in the case of the middle slit or inextensible cables in the case of the entrance and exit slits is again linear, the ratio being determined by the relative arm lengths defined by the two bell crank arms in the case of the rods and the relative distances from the center of rotation of the cam follower and cable fastening 93 in the case of the cables going to the two other slits.

Since each cam moves its slit defining member so as to keep this movement in proportion to a certain predetermined function of the linear movement, the relative displacement of the two cams linearly will cause each slit member to move in proportion to the same function and hence to define a slit which is proportional to the differences defined by the linear displacement of the two cams and readable on the linear scale. By the choice of suitable profile of cam, the linear scale on the table may represent position in spectrum and band width in terms of wavelength, frequency or any function thereof which it is desired to maintain constant. With any given profile for the two cams, adjustment of band width in terms of the function defined by the cam profile can be effected without disassembling the mechanism by simply turning the knurled disc 83.

The monochromator illustrated in the drawings is shown with a scale calibrated in wavelengths and will be described in conjunction with this modification. The scale can obviously be in frequency with a corresponding change in the profile of the cams. The operation of the spectrum selecting means has been described above. The table 28 is driven by any suitable means such as a drive from an electric motor. The two cams 69 and 70 move linearly with the table and are displaced with respect to each other by the amount measured by the pointer 85 as described above. The cam follower on one of the cams is connected through its bell crank and rods and cables to one of the slit defining members of each of the slits. In the case of the upper cam 70 this is the bell crank 88 and the rod 92 to the jaw member 46 of the central slit, and in the case of the lower cam 69 it is the bell crank 87, rod 91 and the carriage 44. As the table moves, the carriage 44 is moved in proportion to the width of a unit of wavelength in the prismatic spectrum. Accordingly the portion of the spectrum reflected onto the exit slit and hence selected, is determined by this movement. The slit defining member 46 moves in the same proportion but it is displaced with respect to the mirror because the cam driving it is displaced with respect to the other cam. This displacement is again in proportion to the physical width of a unit of wavelength in different portions of the spectrum. Hence the central slit will be maintained always in proportion to a given selected wavelength range determined by the amount of displacement of the two cams 69 and 70 measured by the pointer 85. The band width selected therefore will be of constant wavelength. The two steel ribbons 96 and 97 are likewise moved in proportion to the motion of the cam followers and as each ribbon displaces one of the pair of slit defining members defining the entrance slit and the exit slit, the width of these two slits will likewise correspond to the wavelength width selected by setting the displacement of the two cams. The widths of the entrance and exit slits will therefore remain the same as that of the central selecting slit and all three slits of the monochromator will pass a band of light of predetermined wavelength range throughout the whole travel of the monochromator, that is to say, from one end of the spectrum to the other.

It will be apparent that any desired wavelength range for the three slits can be chosen by adjusting the displacement of the cams 69 and 70 by means of the shaft 82 turned by the knurled knob 83 and any band width so selected will be maintained constant throughout the travel of the monochromator.

While I have described my invention in detail with reference to its embodiment in a particular type of monochromator and further with that monochromator used for the particular purposes of a recording spectrophotometer, nevertheless after understanding my invention, it will be obvious to those skilled in the art that changes and modifications may be made, without departing from the spirit or scope of the invention, whereby the invention may be applied to other types of monochromators and to monochromators used for other purposes and whereby further the invention may be employed in a single monochromator to produce more than one variation of its slits; for instance, a single monochromator might transmit, as selected, either intervals of wavelengths, intervals of frequency, or amounts of energy from an associated light source, which intervals or amounts are maintained constant at a selected value throughout the range of wavelength setting of the monochromator.

What I claim is:

1. In a monochromator having a light source, means for forming a prismatic spectrum from the source having spectral bands of equal wave length range which vary in width in different portions of the spectrum, members movable relative to each other defining a variable width exit slit, means for selecting for transmission through the slit light from a desired portion of the spectrum and driving means for actuating said selecting means, the improvement which comprises two cams of identical profile actuated by said driving means, a cam follower engaging each of said cams, linear drive means connecting one of the relatively movable slit defining members to one follower and one to the other, the profile of the cams being such as to maintain constant the band width throughout the spectrum, means for bodily displacing one of the cams in its plane of movement, and means for maintaining the cam in its displaced position.

2. A monochromator according to claim 1 which is provided with a variable width entrance slit in addition to the variable width exit slit and in which the means for selecting light from the desired portion of the spectrum for transmission comprises a variable width selector slit defined by two elements, one of them a movable mirror and another a movable member, the mirror being linearly driven from one of the cam followers and the movable member being linearly driven from the other follower.

ORRIN W. PINEO.